J. K. KORFF.
Combined Water-Cooler and Refrigerator.

No. 161,797. Patented April 6, 1875.

UNITED STATES PATENT OFFICE.

JOHN K. KORFF, OF GEORGETOWN, DISTRICT OF COLUMBIA.

IMPROVEMENT IN COMBINED WATER-COOLERS AND REFRIGERATORS.

Specification forming part of Letters Patent No. 161,797, dated April 6, 1875; application filed February 23, 1875.

*To all whom it may concern:*

Be it known that I, JOHN K. KORFF, of Georgetown, in the District of Columbia, have invented certain new and useful Improvements in Water-Cooler and Refrigerator Combined; and I do hereby declare that the following is a full, clear, and exact description thereof, which will enable others skilled in the art to which it pertains to make and use the same, reference being had to the accompanying drawings and to the letters of reference marked thereon, which form a part of this specification.

My invention relates to improvements in refrigerators and ice-coolers combined; and it consists in adapting to the circumference of the inner walls of a circular refrigerating-chamber a crescent-shaped pan, so as to economize the space within said chamber, as will hereinafter be more fully described, and pointed out in the claim.

Figure 1:
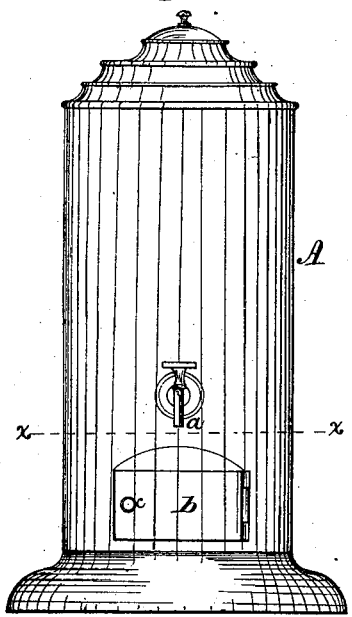
Figure 2:
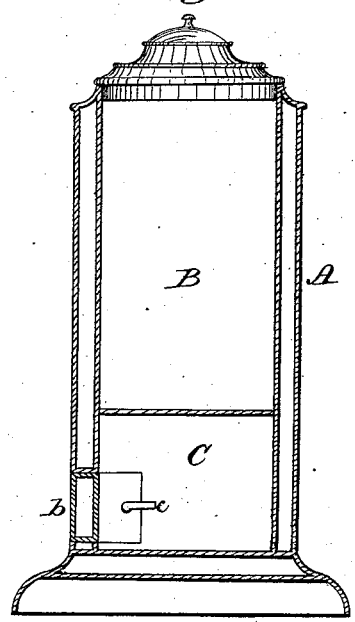
Figure 3:
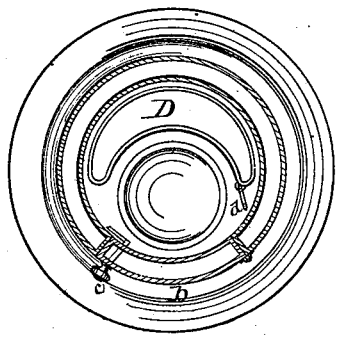

Referring to the drawings, Figure 1 is a front elevation of my improved invention. Fig. 2 is a longitudinal vertical section of the same, and Fig. 3 is a transverse section taken on the line $x\ x$ of Fig. 1.

Similar letters of reference occurring on the several figures indicate corresponding parts.

A represents a water-cooler, having a water-compartment, B, provided with an ordinary spigot, $a$. C represents a refrigerating-chamber arranged at the base of the cooler A, and directly under the water-compartment B. This refrigerating-chamber is furnished with a door, $b$, and is also provided with a pan of semicircular shape, which is adapted to fit around the inner circumference of the said chamber, leaving space enough near the center of the same to admit of a butter-dish being placed therein.

The walls of the water-cooler and refrigerating-chamber are of the usual construction, the space between the inner and outer walls being filled or packed with charcoal, cork, or other suitable filling; the door $b$ of the chamber C being also formed with double walls, filled in a similar manner. By thus constructing a water-cooler, with this refrigerating-chamber separate and apart from the compartment in which the ice is deposited, I secure a more moderate degree of coldness than can be obtained in those refrigerators in which the currents of cold air are directed by passages and valves to the bottom of the refrigerating-chamber.

In actual use and experiment it will be found that where milk, butter, and other provisions are placed in the descending currents of cold air they will become tainted quicker by exposure to the atmosphere than if they had been subjected to a more moderate degree of cold.

My invention is adapted for keeping milk and butter only, for where milk and butter are placed in the same refrigerator with meat, lard, and other provisions, they soon acquire the scent from the same, and are much more likely to become tainted than when kept separately to themselves.

My invention is also specially adapted for keeping milk in a bed-room in a fresh and pure condition, for feeding infants, while at the same time a supply of ice-water can be kept constantly on hand.

In the operation of my invention the ice is placed in the water chamber B, and the pan D is filled with milk or cream, and adjusted in its position around the refrigerating-chamber C; the butter-dish is then placed in the center, and the door $a$ closed and secured by the knob and catch $c$. When it is desired to use the milk in the pan D the same can be removed by catching hold of the ring $d$, attached to one end of the pan, and pulling it out, said pan being so constructed that the ends of the same are of a tapering shape, and from which the milk can be poured into a bottle or other vessel without spilling it.

The advantages of having the pan D constructed in the present shape are, that it can be introduced endwise through a small door in the side of the refrigerating-chamber, and as it is a material improvement to have the doors of refrigerating-chambers as small as possible, the improvement is readily apparent; also, the contents of the said pan can be readily poured into other vessels without spilling, and also the space within the refrigerating-chamber is economized.

Having thus described my invention, what

I claim as new, and desire to secure by Letters Patent, is—

The combination of the refrigerating-chamber C, having an entrance and a circular perimeter, the crescent-shaped pan D, and inner circular dish, as and for the purposes described.

In testimony that I claim the foregoing as my own invention, I affix my signature in presence of two witnesses.

JNO. K. KORFF.

Witnesses:
PARKER H. SWEET, Jr.,
H. B. BESTOR.